United States Patent
Qi

(10) Patent No.: US 10,972,791 B1
(45) Date of Patent: Apr. 6, 2021

(54) DIGITAL TELEVISION, ELECTRONIC DEVICE AND CONTROL METHODS THEREOF

(71) Applicants: K-Tronics (Suzhou) Technology Co., Ltd., Jiangsu (CN); BOE TECHNOLOGY GROUP CO., LTD., Beijing (CN)

(72) Inventor: Fuchun Qi, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/840,629

(22) Filed: Apr. 6, 2020

(30) Foreign Application Priority Data

Nov. 29, 2019 (CN) .......................... 201911212381.9

(51) Int. Cl.
*H04N 21/443* (2011.01)
*H04N 5/44* (2011.01)
*H04N 5/63* (2006.01)

(52) U.S. Cl.
CPC ........... *H04N 21/4432* (2013.01); *H04N 5/44* (2013.01); *H04N 5/63* (2013.01)

(58) Field of Classification Search
None
See application file for complete search history.

(56) References Cited

U.S. PATENT DOCUMENTS

| | | | |
|---|---|---|---|
| 10,627,894 B2* | 4/2020 | Ahn | H02J 9/005 |
| 2018/0054587 A1* | 2/2018 | Haskey | H04N 5/63 |
| 2018/0091851 A1* | 3/2018 | Bae | H04N 21/43637 |
| 2018/0098120 A1* | 4/2018 | Cho | H04N 21/44231 |
| 2018/0197501 A1* | 7/2018 | Veeramani | H04N 21/4122 |
| 2018/0234637 A1* | 8/2018 | Marino | H04N 21/43635 |
| 2019/0364335 A1* | 11/2019 | Sato | H04N 21/4432 |
| 2020/0128289 A1* | 4/2020 | Machida | H04N 5/44 |
| 2020/0260019 A1* | 8/2020 | Marino | H04N 5/63 |

* cited by examiner

*Primary Examiner* — John W Miller
*Assistant Examiner* — Mustafizur Rahman
(74) *Attorney, Agent, or Firm* — Westman, Champlin & Koehler, P.A.

(57) ABSTRACT

The present disclosure discloses a digital television, an electronic device, and control methods thereof. The digital television includes an expansion interface, a controller and a voltage converter. The controller is connected to the expansion interface, and is connected to an external electronic device through the expansion interface. The expansion interface is connected to the voltage converter, and the controller is configured to control the voltage converter to supply power to the external electronic device through the expansion interface. The controller is further configured to control the external electronic device to be turned on or turned off and communicate with the external electronic device through the expansion interface.

18 Claims, 3 Drawing Sheets

US 10,972,791 B1

DIGITAL TELEVISION, ELECTRONIC DEVICE AND CONTROL METHODS THEREOF

CROSS-REFERENCE TO RELATED APPLICATION(S)

This application claims priority to the Chinese Patent Application No. CN 201911212381.9, filed on Nov. 29, 2019, which is incorporated herein by reference in its entirety.

TECHNICAL FIELD

The present disclosure relates generally to the technical field of digital television, and more particularly, to a digital television, an electronic device, and control methods thereof.

BACKGROUND

Currently, most digital televisions are disposed separately from set-top boxes, and the televisions and the set-top boxes are provided with power interfaces respectively. When a television is turned on, it is necessary to turn on a set-top box at the same time for watching the television. When the television is turned off, the set-top box also needs to be turned off, which results in tedious user operations. If the set-top box is turned on for a long time, it causes a waste of unnecessary energy.

SUMMARY

According to a first aspect of the embodiments of the present disclosure, there is provided a digital television comprising an expansion interface, a controller and a voltage converter, wherein the controller is connected to the expansion interface, and is connected to an external electronic device through the expansion interface, the expansion interface is connected to the voltage converter, the controller is configured to control the voltage converter to supply power to the external electronic device through the expansion interface, and the controller is further configured to control the external electronic device to be turned on or turned off and communicate with the external electronic device through the expansion interface.

In an embodiment, the expansion interface comprises a positive power supply pin and a negative power supply pin, wherein the positive power supply pin is connected to the voltage converter through a switching transistor, and the negative power supply pin is grounded, and the controller is connected to the switching transistor, and is configured to control the switching transistor to be turned on or turned off, so that the voltage converter is connected to or disconnected from the expansion interface.

In an embodiment, when the voltage converter is connected to the positive power supply pin, the voltage converter supplies power to the external electronic device, and when the voltage converter is disconnected from the positive power supply pin, the power converter stops supplying power to the external electronic device.

In an embodiment, the controller causes the switching transistor to be turned on by outputting a valid enabling signal to the switching transistor, and causes the switching transistor to be turned off by outputting an invalid enabling signal to the switching transistor.

In an embodiment, the expansion interface further comprises a wakeup pin, and the controller transmits a wakeup signal to the wakeup pin to control the external electronic device to be turned on or turned off.

In an embodiment, the controller transmits a valid wakeup signal to the wakeup pin to control the external electronic device to be turned on, and transmits an invalid wakeup signal to the wakeup pin to control the external electronic device to be turned off.

In an embodiment, the expansion interface further comprises communication pins comprising a transmitting pin and a receiving pin, and the controller communicates with the external electronic device through the transmitting pin and the receiving pin.

According to a second aspect of the embodiments of the present disclosure, there is provided a method for controlling the digital television described above, comprising:

controlling, by the controller, the voltage converter to supply power to the external electronic device through the expansion interface, and controlling, by the controller, the external electronic device to be turned on or turned off and communicating with the external electronic device through the expansion interface.

In an embodiment, the expansion interface comprises a positive power supply pin and a negative power supply pin, wherein the positive power supply pin is connected to the voltage converter through a switching transistor, and the negative power supply pin is grounded, and controlling, by the controller, the voltage converter to supply power to the external electronic device through the expansion interface comprises:

controlling, by the controller, the switching transistor to be turned on or turned off, so that the voltage converter is connected to or disconnected from the expansion interface.

In an embodiment, controlling, by the controller, the voltage converter to supply power to the external electronic device through the expansion interface comprises:

causing, by the controller, the switching transistor to be turned on by outputting a valid enabling signal to the switching transistor, and causing the switching transistor to be turned off by outputting an invalid enabling signal to the switching transistor.

In an embodiment, the expansion interface comprises a wakeup pin, and controlling, by the controller, the external electronic device to be turned on or turned off through the expansion interface comprises:

transmitting, by the controller, a wakeup signal to the wakeup pin to control the external electronic device to be turned on or turned off.

In an embodiment, transmitting, by the controller, a wakeup signal to the wakeup pin to control the external electronic device to be turned on or turned off comprises:

transmitting, by the controller, a valid wakeup signal to the wakeup pin to control the external electronic device to be turned on, and transmitting an invalid wakeup signal to the wakeup pin to control the external electronic device to be turned off.

According to a third aspect of the embodiments of the present disclosure, there is provided an electronic device comprising an expansion interface and a controller, wherein the controller is connected to the expansion interface, and is connected to a digital television through the expansion interface, the expansion interface is configured to receive power supplied by the digital television and transmit the power to the controller, and the controller is configured to control the electronic device to be turned on or turned off and communicate with the digital television according to a signal from the expansion interface.

In an embodiment, the expansion interface comprises a positive power supply pin and a negative power supply pin, wherein the positive power supply pin is configured to receive the power supplied by the digital television, and the negative power supply pin is grounded, and the controller receives the power from the positive power supply pin to supply the power to the electronic device.

In an embodiment, the expansion interface comprises a wakeup pin; and the controller is configured to cause the electronic device to be turned on by receiving a valid wakeup signal from the wakeup pin, and cause the electronic device to be turned off by receiving an invalid wakeup signal from the wakeup pin.

In an embodiment, the expansion interface further comprises communication pins comprising a transmitting pin and a receiving pin, and the controller communicates with the digital television through the transmitting pin and the receiving pin.

In an embodiment, the electronic device is a set-top box.

According to a fourth aspect of the embodiments of the present disclosure, there is provided a method for controlling the electronic device described above, comprising:

receiving, by the expansion interface, power supplied by the digital television and transmitting the power to the controller, and controlling, by the controller, the electronic device to be turned on or turned off and communicating with the digital television according to a signal from the expansion interface.

In an embodiment, the expansion interface comprises a wakeup pin, and controlling, by the controller, the electronic device to be turned on or turned off according to a signal from the expansion interface comprises:

causing, by the controller, the electronic device to be turned on by receiving a valid wakeup signal from the wakeup pin, and causing the electronic device to be turned off by receiving an invalid wakeup signal from the wakeup pin.

In an embodiment, the expansion interface further comprises communication pins comprising a transmitting pin and a receiving pin; and communicating, by the controller, with the digital television according to a signal from the expansion interface comprises:

communicating, by the controller, with the digital television through the transmitting pin and the receiving pin.

BRIEF DESCRIPTION OF THE ACCOMPANYING DRAWINGS

Other features, purposes, and advantages of the present disclosure will become more apparent by reading the detailed description of the non-limiting embodiments made with reference to the following accompanying drawings.

DETAILED DESCRIPTION

The present disclosure will be further described in detail below with reference to the accompanying drawings and the embodiments. It may be understood that the specific embodiments described here are only used to explain the related disclosure, rather than limiting the present disclosure. It should also be illustrated that, for convenience of description, only parts related to the present disclosure are shown in the accompanying drawings.

Unless otherwise defined, the technical or scientific terms used in the present disclosure shall have the ordinary meanings understood by those of ordinary skill in the art to which the present disclosure belongs. Words such as "first", "second", etc. used in the present disclosure do not indicate any order, quantity, or importance, but are only used to distinguish different components. Words such as "including" or "comprising" etc. mean that an element or item appearing before the word covers elements or items appearing after the word and equivalents thereof without excluding other elements or items. Words such as "connected to" or "connected with" etc. are not limited to physical or mechanical connections, but may comprise electrical connections, regardless of direct connections or indirect connections. "Up", "down", "left", "right", etc. are only used to indicate a relative position relationship. When an absolute position of an object described changes, the relative position relationship may also change accordingly.

It should be illustrated that, the embodiments in the present disclosure and the features in the embodiments may be combined with each other without a conflict. The present disclosure will be described in detail below with reference to the accompanying drawings and embodiments.

The present disclosure primarily aims to provide a digital television and a control method thereof. The digital television may supply power to an external electronic device and control the external electronic device to be turned on or turned off. The external electronic device may be turned on while the digital television is started up and the external electronic device may be turned off while the digital television is turned off, which realizes synchronization between turn-on/turn-off of the television and turn-on/turn-off of the external electronic device, thereby achieving effects of simple operations and energy saving.

With the technical solutions according to the embodiments of the present disclosure, an expansion interface having power supply pins and a wakeup pin is connected to the external electronic device, and controls the external electronic device to be powered on and started up, which solves the problems of tedious operations and a waste of energy caused by disposing the digital television separately from the external electronic device.

For convenience of description, in the embodiments, description is made by taking the external electronic device being a set-top box as an example.

Figure 1:
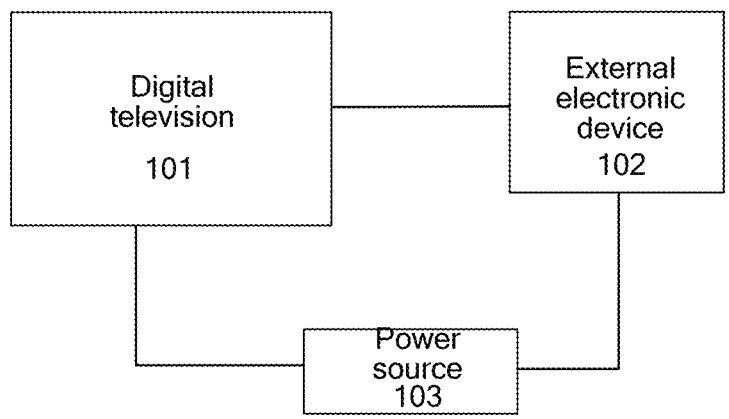
FIG. 1 illustrates a schematic diagram of an operating mode between an existing digital television and an external electronic device.

As shown in FIG. 1, an existing digital television 101 and a set-top box 102 are provided with respective power interfaces, and need to be connected to a power source 103 respectively when in use. Data is exchanged between the digital television 101 and the set-top box 102 through a connection line. At this time, when the digital television 101 is turned on, the set-top box 102 needs to be turned on separately for watching the digital television 101, and when the digital television 101 is turned off, the set-top box 102 also needs to be turned off separately, which results in tedious user operations. If the set-top box is turned on for a long time, it causes a waste of unnecessary energy.

Figure 2:
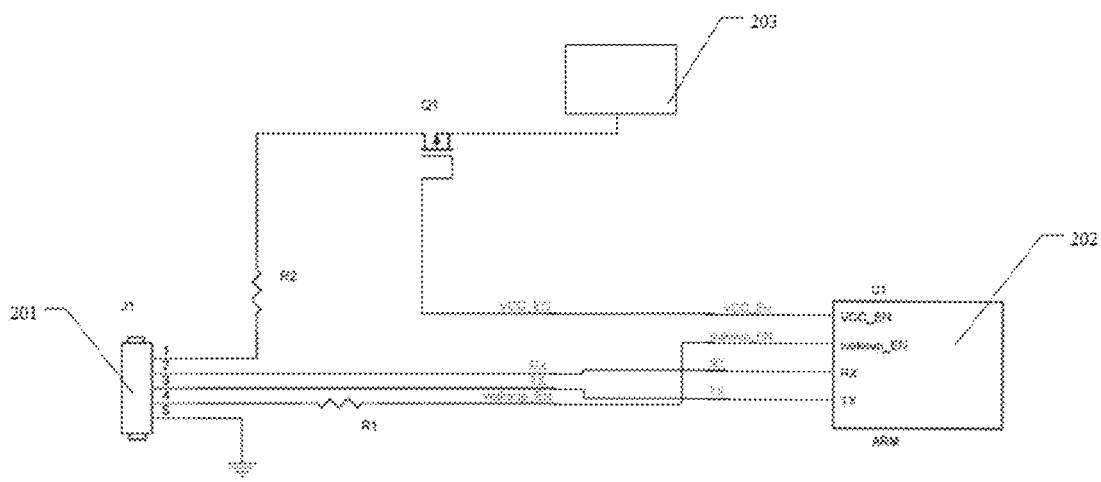
FIG. 2 illustrates an exemplary structural block diagram of a digital television according to an embodiment of the present disclosure.

In order to solve the above problems, as shown in FIG. 2, the present disclosure discloses a digital television. The digital television comprises an expansion interface 201, a controller 202, and a voltage converter 203. The controller 202 is connected to the expansion interface 201 and is connected to a set-top box 102 through the expansion interface 201.

The expansion interface 201 is connected to the voltage converter 203.

The controller 202 is configured to control the voltage converter 203 to supply power to the set-top box 102 through the expansion interface 201.

The controller 202 is further configured to control the external electronic device 102 to be turned on or turned off and communicate with the set-top box 102 through the expansion interface 201.

Figure 3:
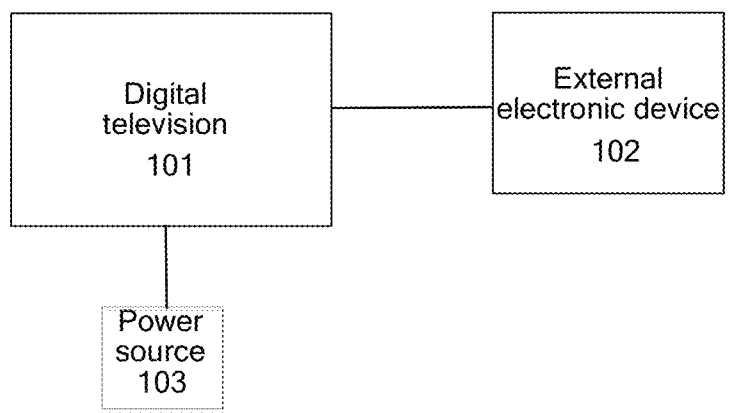
FIG. 3 illustrates a schematic diagram of an operating mode between a digital television and an external electronic device according to an embodiment of the present disclosure.

A connection in an operating mode between the digital television 101 and the set-top box 102 is shown in FIG. 3. At this time, the set-top box 102 no longer needs to be connected to an external power source separately, and may receive power supplied by the digital television. In the present embodiment, the controller 202 is implemented using an Advanced RISC Machines (ARM) chip.

It should be illustrated that the external electronic device is not limited to a set-top box, and may also be other devices such as a lighting device, a speaker box, an intelligent gateway etc., which is not limited here.

In an embodiment, the expansion interface comprises a positive power supply pin 1 and a negative power supply pin 5. The positive power supply pin 1 is connected to the voltage converter 203 through a switching transistor Q1. The controller 202 controls the switching transistor Q1 to be turned and turned off. The negative power supply pin 5 is grounded.

Figure 4:
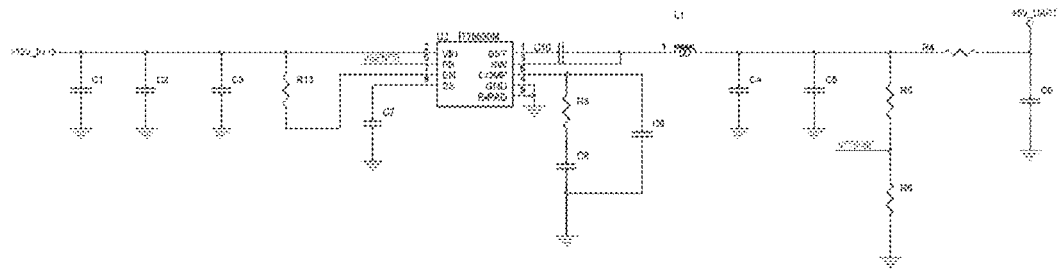
FIG. 4 illustrates an exemplary circuit diagram of a voltage converter in FIG. 2.

Specifically, as shown in FIG. 2, the positive power supply pin 1 is connected to a first electrode of the switching transistor Q1 through a current limiting resistor R2, a gate of the switching transistor Q1 is connected to one of a plurality of General-Purpose Input/Output (GPIO) ports of the controller 202, and a second electrode of the switching transistor Q1 is connected to the voltage converter 203. When the digital television needs to be turned on or needs to supply power to the external electronic device, the controller 202 outputs a valid enabling signal VCC_EN to the switching transistor Q1 to control the switching transistor Q1 to be turned on. The switching transistor Q1 is turned on, and power from the voltage converter 203 is supplied to the positive power supply pin 1 of the expansion interface 201 through the switching transistor Q1. Thus, the expansion interface 201 outputs the power supplied by the voltage converter 203 to the external electronic device. The voltage converter may convert a voltage of 12V of the digital television into a voltage required by the external electronic device. The valid enabling signal VCC_EN may be a high-level signal or a low-level signal, which is determined according to characteristics of the switching transistor Q1. FIG. 4 illustrates a voltage converter which converts a voltage of 12V to a voltage of 5V based on an IT76630M chip.

In an embodiment, the expansion interface 201 further comprises a wakeup pin 4, and the controller 202 transmits a wakeup signal for causing the external electronic device to be turned on or turned off to the external electronic device through the wakeup pin 4.

Specifically, after the power is supplied to the external electronic device, the external electronic device may be started up to operate through the wakeup pin 4. In the present embodiment, the wakeup pin 4 is connected to another one of the plurality of GPIO ports of the controller 202. The other GPIO port controls the external electronic device to be turned on and turned off through a wakeup signal wakeup EN, and forms a soft switch which controls the external electronic device through a signal. The wakeup signal EN may be a rising edge of a pulse, a falling edge of a pulse, or a combination of multiple pulses. The signal used may be set according to an application scenario, and is not limited here. After the external electronic device receives the corresponding wakeup signal, the electronic device is started up. At this time, the digital television may provide a user with an interactive interface for controlling the external electronic device by setting options in an On-Screen Display (OSD) menu.

The expansion interface 201 further comprises communication pins comprising a receiving pin 2 and a transmitting pin 3.

The controller 202 communicates with the external electronic device through the communication pins.

As shown in FIG. 2, when the digital television needs to communicate with the external electronic device, the controller communicates with the external electronic device through the transmitting pin 3 and the receiving pin 2. In the present embodiment, the transmitting pin 3 and the receiving pin 2 are connected to two of the plurality of GPIO ports of the controller respectively, and the controller 202 receives a transmitting signal TX and a receiving signal RX through the GPIO ports.

Figure 5:
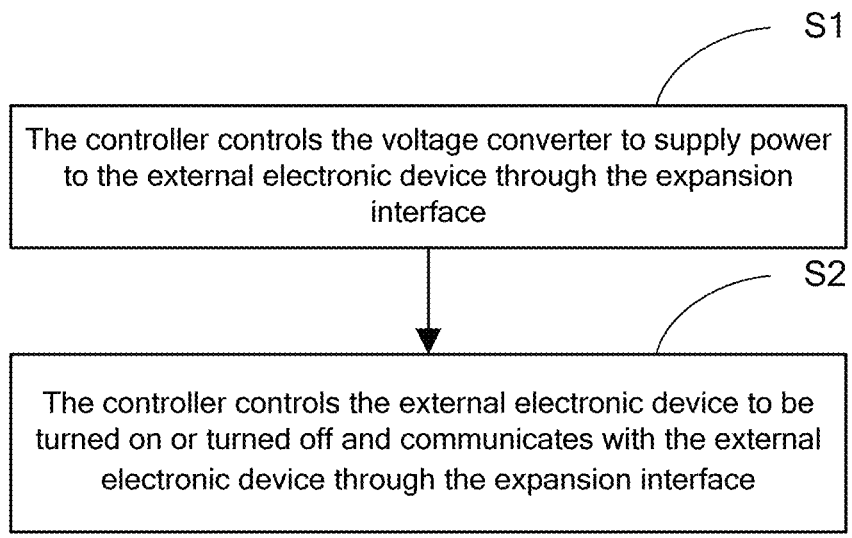
FIG. 5 illustrates a flowchart of a method for controlling a digital television according to an embodiment of the present disclosure.

The present disclosure further discloses a method for controlling the digital television according to the embodiments of the present disclosure. As shown in FIG. 5, the method comprises the following steps.

In step S1, the controller controls the voltage converter to supply power to the external electronic device through the expansion interface.

In step S2, the controller controls the external electronic device to be turned on or turned off and communicates with the external electronic device through the expansion interface.

Specifically, as shown in FIG. 2, when the digital television needs to cause the external electronic device to be started up, or after the digital television is turned on, the controller 202 outputs a valid enabling signal VCC_EN through a GPIO port to cause the switching transistor Q1 to be turned on, so that power from the voltage converter 203 is output to the external electronic device. In addition, the controller 202 causes the external electronic device to be started up to operate by outputting a wakeup signal wakeup_EN. The valid wakeup signal wakeup_EN here may be a predetermined pulse signal. The predetermined pulse signal may be a rising edge of a pulse, a falling edge of a pulse, or a combination of pulse signals, which is not limited here and is set according to an application scenario.

In the embodiment, the controller 202 causes the external electronic device to be turned off by outputting an invalid wakeup signal wakeup_EN.

The controller causes the switching transistor Q1 to be turned off by outputting an invalid enabling signal VCC_EN, so that the power supplied to the external electronic device is disabled.

Specifically, when the digital television needs to cause the external electronic device to be turned off, or before the digital television is turned off, the external electronic device is turned off not to operate by outputting the wakeup signal wakeup_EN thereto. Further, the controller 202 causes the switching transistor Q1 to be turned off by outputting an invalid enabling signal VCC_EN through the GPIO port, so that the power supplied by the voltage converter 203 to the external electronic device is disabled. The invalid wakeup signal here may be a predetermined combination of pulse signals, which is not limited here, and is set according to a specific application scenario.

Figure 6:
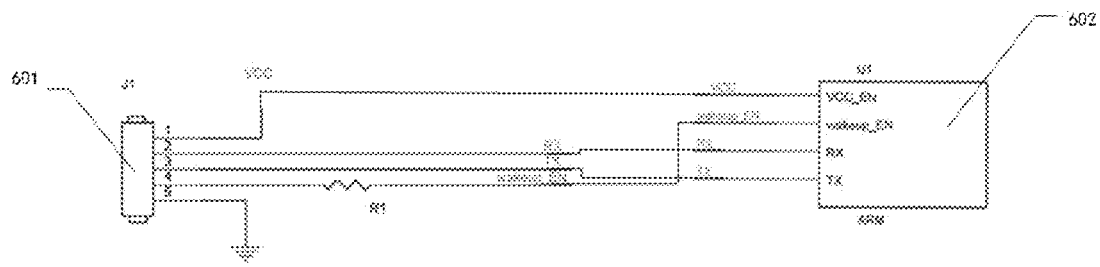
FIG. 6 illustrates an exemplary structural block diagram of an electronic device according to an embodiment of the present disclosure.

The present disclosure further discloses an electronic device. As shown in FIG. 6, the electronic device comprises an expansion interface 601 and a controller 602. The controller 602 is connected to a digital television through the expansion interface 601.

The controller 602 controls the electronic device to be turned on or turned off according to a signal from the expansion interface 601.

Specifically, the electronic device is connected to the digital television according to the embodiment of the present disclosure through the expansion interface 601. The expansion interface 601 comprises a positive power supply pin 1 and a negative power supply pin 5, and receives power supplied by the digital television through the positive power supply pin 1. The negative power supply pin 5 is grounded.

In an embodiment, the expansion interface 601 of the electronic device comprises a wakeup pin 4, and when the controller 602 receives a valid wakeup signal wakeup_EN through the wakeup pin 4, the electronic device is started up to operate. When the controller 602 receives an invalid wakeup signal wakeup_EN through the wakeup pin 4, the electronic device is turned off.

By taking a set-top box as an example, after the controller 602 receives a valid wakeup signal wakeup_EN, programs in the set-top box start running, etc., and when the controller 602 receives an invalid wakeup signal wakeup_EN, all the programs in the set-top box stops running.

In addition, in an embodiment, the expansion interface 601 further comprises communication pins comprising a receiving pin 2 and a transmitting pin 3. The controller 602 communicates with the digital television through the communication pins.

As shown in FIG. 6, when the electronic device communicates with the digital television, the controller receives and transmits signals through the transmitting pin 3 and the receiving pin 2.

Figure 7:
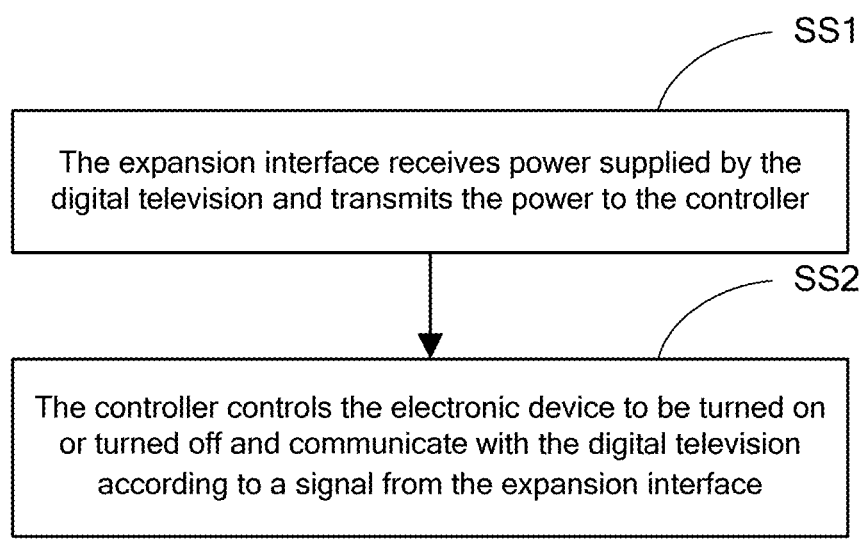
FIG. 7 illustrates a flowchart of a method for controlling an electronic device according to an embodiment of the present disclosure.

The present disclosure further discloses a method for controlling the electronic device according to the embodiments of the present disclosure. As shown in FIG. 7, the method comprises the following steps.

In step SS1, the expansion interface receives power supplied by the digital television and transmits the power to the controller.

In step SS2, the controller controls the electronic device to be turned on or turned off and communicate with the digital television according to a signal from the expansion interface.

As shown in FIG. 6, the controller 602 receives a wakeup signal wakeup_EN from the digital television, and determines whether the wakeup signal is a valid signal or an invalid signal, and if the wakeup signal is a valid wakeup signal, the electronic device is started up to operate, and if the wakeup signal is an invalid wakeup signal, the electronic device is turned off. By taking the electronic device being a set-top box as an example, when the electronic device is started up, programs in the electronic device run; and when the electronic device is turned off, all the programs stop running.

The above description is only preferred embodiments of the present disclosure and an explanation of the applied technical principles. It should be understood by those skilled in the art that the scope of the disclosure involved in the present disclosure is not limited to the technical solutions obtained by a specific combination of the above technical features, but also covers, without departing from the concept of the present disclosure, other technical solutions obtained by any combination of the above technical features or equivalent features thereof, for example, technical solutions formed by replacing the above features with (but not limited to) technical features disclosed in the present disclosure having similar functions.

We claim:

1. A digital television comprising an expansion interface, a controller and a voltage converter, wherein
    the controller is connected to the expansion interface, and is connected to an external electronic device through the expansion interface,
    the expansion interface is connected to the voltage converter,
    the controller is configured to control the voltage converter to supply power to the external electronic device through the expansion interface, and
    the controller is further configured to control the external electronic device to be turned on or turned off and communicate with the external electronic device through the expansion interface,
    wherein,
    the expansion interface comprises a positive power supply pin and a negative power supply pin, wherein the positive power supply phi is connected to the voltage convener through a switching transistor, and the negative power supply pin is grounded, and
        the controller is connected to the switching transistor, and is configured to control the switching transistor to be turned on or turned off, so that the voltage converter is connected to or disconnected from the expansion interface.

2. The digital television according to claim 1, wherein when the voltage converter is connected to the positive power supply pin, the voltage converter supplies power to the external electronic device, and
    when the voltage converter is disconnected from the positive power supply pin, the power converter stops supplying power to the external electronic device.

3. The digital television according to claim 1, wherein the controller causes the switching transistor to be turned on by outputting a valid enabling signal to the switching transistor, and causes the switching transistor to be turned off by outputting an invalid enabling signal to the switching transistor.

4. The digital television according to claim 1, wherein the expansion interface further comprises a wakeup pin, and
the controller transmits a wakeup signal to the wakeup pin to control the external electronic device to be turned on or turned off.

5. The digital television according to claim 4, wherein the controller transmits a valid wakeup signal to the wakeup pin to control the external electronic device to be turned on, and transmits an invalid wakeup signal to the wakeup pin to control the external electronic device to be turned off.

6. The digital television according to claim 1, wherein the expansion interface further comprises communication pins comprising a transmitting pin and a receiving pin, and
the controller communicates with the external electronic device through the transmitting pin and the receiving pin.

7. A method for controlling the digital television according to claim 1, comprising:
controlling, by the controller, the voltage converter to supply power to the external electronic device through the expansion interface, and
controlling, by the controller, the external electronic device to be turned on or turned off and communicating with the external electronic device through the expansion interface.

8. The method according to claim 7, wherein
the expansion interface comprises a positive power supply pin and a negative power supply pin, wherein the positive power supply pin is connected to the voltage converter through a switching transistor, and the negative power supply pin is grounded, and
controlling, by the controller, the voltage converter to supply power to the external electronic device through the expansion interface comprises:
controlling, by the controller, the switching transistor to be turned on or turned off, so that the voltage converter is connected to or disconnected from the expansion interface.

9. The method according to claim 8, wherein controlling, by the controller, the voltage converter to supply power to the external electronic device through the expansion interface comprises:
causing, by the controller, the switching transistor to be turned on by outputting a valid enabling signal to the switching transistor, and causing the switching transistor to be turned off by outputting an invalid enabling signal to the switching transistor.

10. The method according to claim 7, wherein the expansion interface comprises a wakeup pin, and
controlling, by the controller, the external electronic device to be turned on or turned off through the expansion interface comprises:
transmitting, by the controller, a wakeup signal to the wakeup pin to control the external electronic device to be turned on or turned off.

11. The method according to claim 10, wherein transmitting, by the controller, a wakeup signal to the wakeup pin to control the external electronic device to be turned on or turned off comprises:
transmitting, by the controller, a valid wakeup signal to the wakeup pin to control the external electronic device to be turned on, and transmitting an invalid wakeup signal to the wakeup pin to control the external electronic device to be turned off.

12. An electronic device comprising an expansion interface and a controller, wherein
the controller is connected to the expansion interface, and is connected to a digital television through the expansion interface,
the expansion interface is configured to receive power supplied by the digital television and transmit the power to the controller, and
the controller is configured to control the electronic device to be turned on or turned off and communicate with the digital television according to a signal from the expansion interface,
wherein the expansion interface comprises a positive power supply pin and a negative power supply pin, wherein the positive power supply pin if configured to receive the power supplied by the digital television, and the negative power supply pin is grounded, and
the controller receives the power from the positive power supply pin to supply the power to the electronic device.

13. The electronic device according to claim 12, wherein the expansion interface comprises a wakeup pin; and
the controller is configured to cause the electronic device to be turned on by receiving a valid wakeup signal from the wakeup pin, and cause the electronic device to be turned off by receiving an invalid wakeup signal from the wakeup pin.

14. The electronic device according to claim 12, wherein the expansion interface further comprises communication pins comprising a transmitting pin and a receiving pin, and
the controller communicates with the digital television through the transmitting pin and the receiving pin.

15. The electronic device according to claim 12, wherein the electronic device is a set-top box.

16. A method for controlling the electronic device according to claim 12, comprising:
receiving, by the expansion interface, power supplied by the digital television and transmitting the power to the controller, and
controlling, by the controller, the electronic device to be turned on or turned off and communicating with the digital television according to a signal from the expansion interface.

17. The method according to claim 16, wherein the expansion interface comprises a wakeup pin, and
controlling, by the controller, the electronic device to be turned on or turned off according to a signal from the expansion interface comprises:
causing, by the controller, the electronic device to be turned on by receiving a valid wakeup signal from the wakeup pin, and causing the electronic device to be turned off by receiving an invalid wakeup signal from the wakeup pin.

18. The method according to claim 16, wherein the expansion interface further comprises communication pins comprising a transmitting pin and a receiving pin; and
communicating, by the controller, with the digital television according to a signal from the expansion interface comprises:
communicating, by the controller, with the digital television through the transmitting pin and the receiving pin.

* * * * *